US009663164B2

(12) United States Patent
Vik et al.

(10) Patent No.: US 9,663,164 B2
(45) Date of Patent: May 30, 2017

(54) UNDERCARRIAGE SYSTEM FOR A TRACKED WORK VEHICLE

(71) Applicant: CNH Industrial America LLC, New Holland, PA (US)

(72) Inventors: Brian D. Vik, Barnesville, MN (US); Daniel J. Zurn, Horace, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/391,101

(22) PCT Filed: Jun. 28, 2013

(86) PCT No.: PCT/US2013/048468
§ 371 (c)(1),
(2) Date: Oct. 7, 2014

(87) PCT Pub. No.: WO2014/022044
PCT Pub. Date: Feb. 6, 2014

(65) Prior Publication Data
US 2015/0217818 A1     Aug. 6, 2015

Related U.S. Application Data

(60) Provisional application No. 61/677,405, filed on Jul. 30, 2012.

(51) Int. Cl.
| | | |
|---|---|---|
| *B62D 55/30* | (2006.01) | |
| *B62D 55/14* | (2006.01) | |
| *B62D 65/00* | (2006.01) | |

(52) U.S. Cl.
CPC ........... *B62D 55/305* (2013.01); *B62D 55/14* (2013.01); *B62D 65/00* (2013.01); *Y10T 29/49449* (2015.01)

(58) Field of Classification Search
CPC ...... B62D 55/305; B62D 55/14; B62D 55/00; Y10T 29/49449
(Continued)

(56) References Cited

U.S. PATENT DOCUMENTS 2,146,168 A * 2/1939 Baker ................... B62D 49/00
180/370
2,426,816 A * 9/1947 Busque .................. B62D 55/04
180/6.7
(Continued)

FOREIGN PATENT DOCUMENTS

| CN | 1665713 | 9/2005 |
|---|---|---|
| CN | 102390447 | 3/2012 |

(Continued)

OTHER PUBLICATIONS

PCT Search Report for PCT Application No. PCT/US2013/048468 dated Aug. 13, 2013 (9 pages).
(Continued)

*Primary Examiner* — S. Joseph Morano
*Assistant Examiner* — Jean Charleston
(74) *Attorney, Agent, or Firm* — Rickard K. DeMille; Rebecca L. Henkel

(57) ABSTRACT

An undercarriage system for a tracked work vehicle is provided that includes a tensioning system configured to provide tension to a continuous track. Additionally, the undercarriage system includes an undercarriage beam having a first opening and a second opening. The first opening is located on an upper face of the undercarriage beam and is configured to enable insertion of the tensioning system inside a cavity of the undercarriage beam. The second opening is located at one longitudinal end of the undercarriage beam and is configured to enable a portion of the tensioning system to extend through the second opening.

(Continued)

Furthermore, the tensioning system pivotably couples to an idler wheel via a pivot assembly, and the idler wheel is configured to engage the continuous track.

21 Claims, 6 Drawing Sheets

(58) Field of Classification Search
USPC ....... 305/125, 120, 124, 130, 131, 132, 135, 305/142–147, 149; 180/9.5, 9.62, 9.64
See application file for complete search history.

(56) References Cited

U.S. PATENT DOCUMENTS

| | | | |
|---|---|---|---|
| 2,729,532 A | | 1/1956 | Schwartz et al. |
| 2,959,451 A | | 11/1960 | Weber |
| 2,996,338 A | * | 8/1961 | Hill .................. B62D 55/15 305/124 |
| 3,204,982 A | * | 9/1965 | Loughary ............ B60G 7/04 280/5.24 |
| 3,938,605 A | | 2/1976 | Koch |
| 3,938,606 A | | 2/1976 | Yancey |
| 4,161,304 A | | 7/1979 | Brenner et al. |
| 4,837,694 A | | 6/1989 | Narita et al. |
| 4,844,195 A | | 7/1989 | Deli et al. |
| 5,316,381 A | | 5/1994 | Isaacson et al. |
| 5,340,205 A | | 8/1994 | Nagorcka |
| 5,343,960 A | | 9/1994 | Gilbert |
| 5,452,949 A | | 9/1995 | Kelderman |
| 5,505,274 A | | 4/1996 | Satzler |
| 5,607,210 A | | 3/1997 | Brazier |
| 5,829,848 A | | 11/1998 | Kelderman |
| 5,842,757 A | | 12/1998 | Kelderman |
| 5,899,542 A | | 5/1999 | Lykken et al. |
| 5,899,543 A | | 5/1999 | Lykken et al. |
| RE36,284 E | | 8/1999 | Kelderman |
| 6,062,662 A | | 5/2000 | Witt |
| 6,068,353 A | | 5/2000 | Juncker et al. |
| 6,318,484 B2 | | 11/2001 | Lykken et al. |
| 6,401,847 B1 | | 6/2002 | Lykken |
| 6,543,861 B1 | | 4/2003 | Kahle et al. |
| 6,543,862 B1 | | 4/2003 | Kahle et al. |
| 6,557,953 B1 | | 5/2003 | Kahle et al. |
| RE38,858 E | | 11/2005 | Grawey et al. |
| 7,172,257 B2 | | 2/2007 | Tamaru et al. |
| 7,255,184 B2 | * | 8/2007 | Loegering ............ B62D 55/084 180/9.21 |
| 7,383,914 B2 | | 6/2008 | Rasset et al. |
| 7,467,831 B2 | | 12/2008 | Bertoni |
| 7,562,727 B1 | | 7/2009 | Hoffart |
| 7,644,788 B2 | | 1/2010 | Scheetz |
| 7,708,092 B2 | | 5/2010 | Després |
| 7,726,749 B2 | | 6/2010 | Rosenboom |
| 7,770,902 B1 | * | 8/2010 | Davis .................... B60G 3/145 180/9.5 |
| 7,866,420 B1 | | 1/2011 | Claas et al. |
| 7,914,087 B2 | | 3/2011 | Alfthan |
| 2005/0035654 A1 | * | 2/2005 | Tamaru ................ B62D 55/30 305/145 |

FOREIGN PATENT DOCUMENTS

CN 102458970 5/2012
DE 2030019 12/1971

OTHER PUBLICATIONS

Chinese Office Action for Chinese Application No. 201380024381.0 dated Feb. 26, 2016 (10 pages).

* cited by examiner

UNDERCARRIAGE SYSTEM FOR A TRACKED WORK VEHICLE

CROSS REFERENCE TO RELATED APPLICATION

This application claims priority from and the benefit of U.S. Patent Provisional Application Ser. No. 61/677,405, entitled "UNDERCARRIAGE SYSTEM FOR A TRACKED WORK VEHICLE", filed Jul. 30, 2012, which is hereby incorporated by reference in its entirety.

BACKGROUND

The present disclosure relates generally to tracked work vehicles, and more particularly, to an undercarriage for a tracked work vehicle.

Certain work vehicles are driven by a track system having continuous tracks and an undercarriage system. Certain track systems include an undercarriage beam and a tensioning system located within the undercarriage beam. The tensioning system provides tension to a respective continuous track. Under some conditions, such as traveling over an uneven surface, the undercarriage beam may be subjected to torsional loads. Some undercarriage beams may enable the insertion of the tensioning system through an opening at a longitudinal end of the beam. However, by placing an opening at the longitudinal end of the beam. Large enough to receive the tensioning system, the undercarriage beam may be less resistant to torsional loads. Accordingly, additional material (e.g., iron) may be disposed around the opening to enhance torsional rigidity. However, by disposing additional material around the opening, the cost and weight of the undercarriage beam may be increased.

BRIEF DESCRIPTION

In one embodiment, an undercarriage system for a tracked work vehicle includes a tensioning system configured to provide tension to a continuous track. Additionally, the undercarriage system includes an undercarriage beam. The undercarriage beam includes a first opening located on an upper face of the undercarriage beam. The first opening is configured to enable insertion of the tensioning system into a cavity of the undercarriage beam. Furthermore, the undercarriage beam includes a second opening located at one longitudinal end of the undercarriage beam. Moreover, the second opening is configured to enable a portion of the tensioning system to extend through the second opening to enable the tensioning system to pivotably couple to an idler wheel via a pivot assembly, and wherein the idler wheel is configured to engage the continuous track In another embodiment, a method for manufacturing an undercarriage system for a tracked work vehicle includes inserting a tensioning system in to a cavity of an undercarriage beam through a first opening in an upper face of the undercarriage beam. Additionally, the method includes extending a portion of the tensioning system through a second opening in a longitudinal end of the undercarriage beam. Furthermore, the method includes tensioning a continuous track using the extended portion of the tensioning system.

In another embodiment, an undercarriage system for a tracked work vehicle includes a continuous track, a pair of idler wheels each configured to engage the continuous track, and a tensioning system configured to tension the continuous track by biasing each idler wheel longitudinally outward. Moreover, the tensioning system includes an extension arm, an actuator, and overload protection system. Additionally, the undercarriage system includes an undercarriage beam disposed about the tensioning system. Furthermore, the undercarriage beam includes a first opening located on an upper face of the undercarriage beam and a second opening located at a longitudinal end of the undercarriage beam. The first opening is configured to enable insertion of the tensioning system into a cavity of the undercarriage beam, and the second opening is configured to enable the extension arm to protrude through the opening to rotatably couple with a respective idler wheel via a pivot assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an undercarriage system configured to damp vibrations between a track and a work vehicle. The undercarriage system uses an undercarriage beam to suspend the vehicle over load bearing wheels. In certain embodiments, the undercarriage beam also houses a tensioning system that provides tension to a continuous track. It is often desirable to locate the tensioning system within the undercarriage beam to protect the tensioning system from contaminants that may interfere with operation of the tensioning system. In some embodiments, the tensioning system may be placed within the undercarriage beam through an opening located at a longitudinal end of the beam. In such embodiments, the opening is large enough for the entire tensioning system to be inserted into the undercarriage beam through the opening. However, the large opening may reduce the torsional rigidity of the undercarriage beam. Accordingly, the beam may be reinforced with additional material (e.g., iron) around the opening. Instead of a large opening on one longitudinal end, the embodiments disclosed herein include an undercarriage beam that enables insertion of the tensioning system through an opening in an upper face of the undercarriage beam. Accordingly smaller opening may be located at each longitudinal end of the beam, thereby providing the desired torsional rigidity without adding additional material the openings. As a result, manufacturing costs and vehicle weight may be reduced without decreasing the ability of the undercarriage beam to withstand torsional loads.

Figure 1:
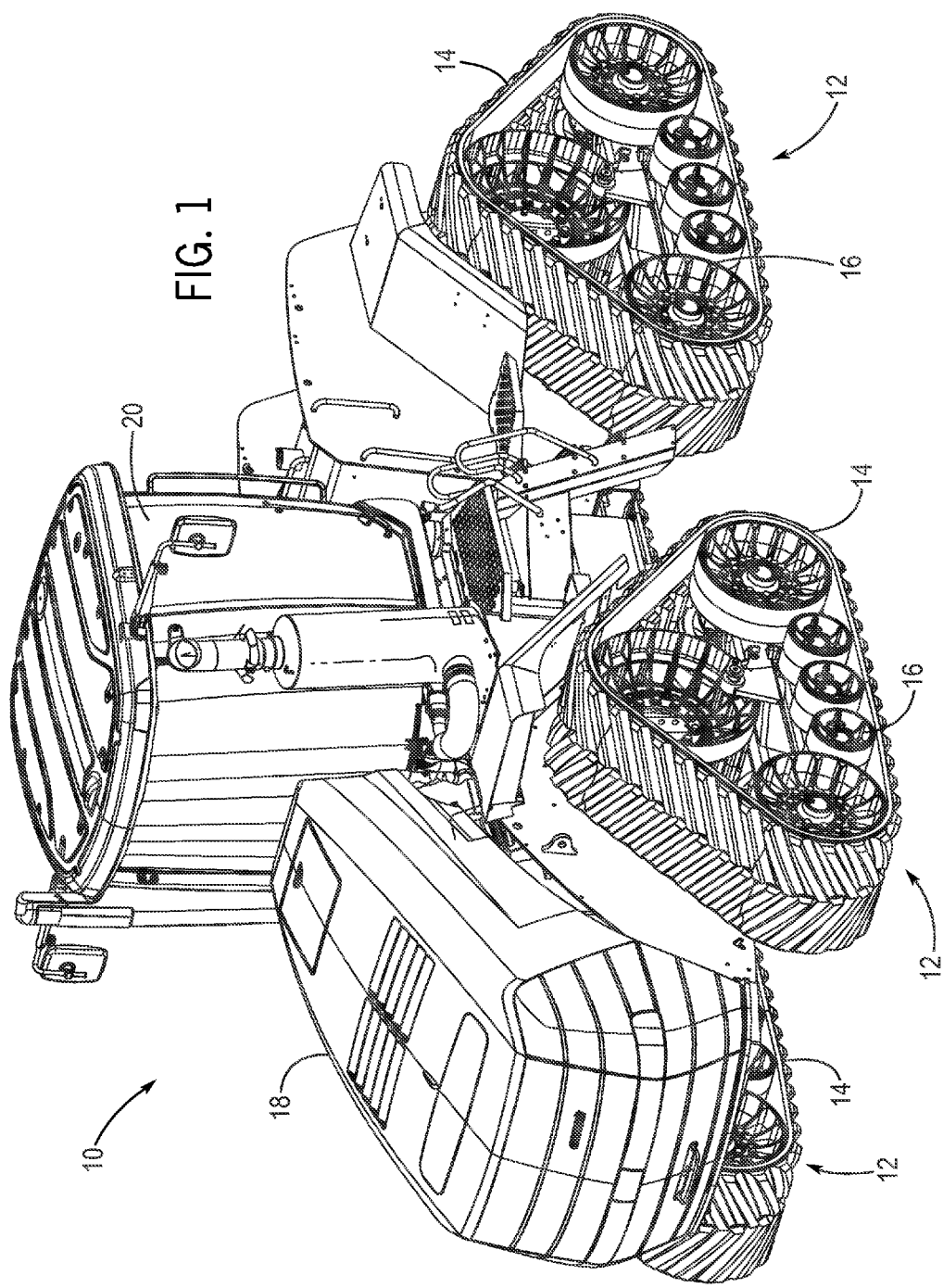
FIG. 1 is a perspective view of an embodiment of a tracked work vehicle having an undercarriage system.

Turning now to the drawings, FIG. 1 is a perspective view of an embodiment of a tracked work vehicle 10. The vehicle 10 includes an undercarriage system 12 used to damp vibrations between a continuous track 14 and the work vehicle 10. The undercarriage system 12 includes an undercarriage beam 16, which may be formed using casting, machining, and/or other suitable methods. Moreover, the undercarriage beam 16 may be formed from steel, iron (e.g., ductile iron), and/or other materials suitable for formation of an undercarriage beam capable of supporting the vehicle 10. Additionally, the undercarriage system 12 supports the work vehicle above the continuous track 14 and may damp rotation and movement of various components of the undercarriage system during operation of the work vehicle 10. Additionally, the tracked work vehicle 10 has a body 18. In certain embodiments, the body 18 may enclose various components used to operate the vehicle 10. For example, in some embodiments, the body 18 may enclose an engine, a transmission, a drive train, an exhaust system, and/or other vehicle components. The vehicle 10 further includes a driver compartment 20. In some embodiments, the driver compartment 20 may be fully enclosed (e.g., having glass windows all around the drive compartment 20), as illustrated. Other embodiments may include a driver compartment 20 that is open to the environment with or without a compartment roof. Furthermore, in certain embodiments, the driver compartment 20 may include steering controls, a seat apparatus, temperature controls, and/or other suitable driver controls.

Figure 2:
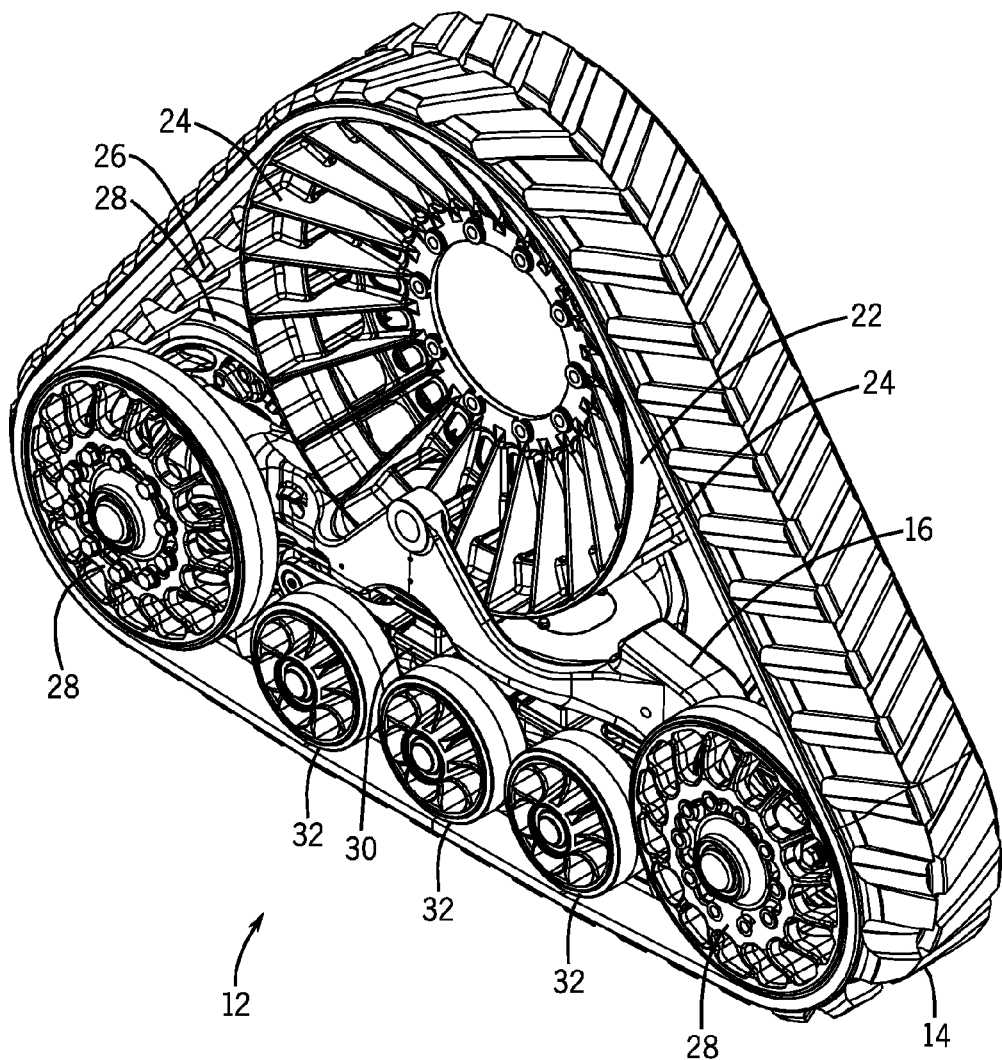
FIG. 2 is a perspective view of an embodiment of an undercarriage system that may be employed within the tracked work vehicle of FIG. 1.

FIG. 2 is a perspective view of an embodiment of the undercarriage system 12. The undercarriage system 12 includes a drive wheel 22 having multiple drive spokes 24 extending from a center to a perimeter of the drive wheel 22. Additionally, the continuous track 14 has multiple track protrusions 26 disposed along the length of the continuous track 14. Moreover, the drive wheel 22 is drivably coupled to the engine of the vehicle 10 so that the engine drives the drive wheel 22 in rotation (e.g., through a drive train, transmission, and/or another suitable drive system). As the drive wheel 22 rotates, the drive spokes 24 engage respective track protrusions 26, thereby driving the continuous track 14.

The illustrated undercarriage system 12 further includes four idler wheels 28 (e.g., a first pair of idler wheels at the front of the track, and a second pair of idler wheels at the back of the track). As discussed below, the idler wheels 28 provide tension to the continuous track 14 to maintain contact between the track protrusions 26 and the respective drive spokes 24. Furthermore, by spacing the idler wheels 28 of each pair at a lateral distance approximately equal to the width of the track protrusions 28, the idler wheels 28 provide guidance to the continuous track 14 to block the continuous track 14 from laterally moving away from the undercarriage system 12. Furthermore, although the illustrated track undercarriage 12 includes four idler wheels 28, other embodiments may include 2, 3, 4, 5, 6, or more idler wheels 28.

As discussed below, a roller wheel beam 30 supports the undercarriage system 12 by coupling with the undercarriage beam 16. The roller wheel beam 30 also couples with multiple roller wheels 32 arranged in two rows. The rows are spaced at a distance greater than equal to the width of the roller wheel beam 30 and width of the protrusions 26. The roller wheels 32 provide support to the undercarriage system and roll along the continuous track 14 when the continuous track 14 is propelled around the undercarriage system 12 by the drive wheel 22. As will be appreciated, it is desirable to distribute the weight of the work vehicle among the roller wheels 32 to reduce loads on the continuous track 14 and/or the undercarriage system 12. For example, if one row of the roller wheels 32 receives an excessive portion of the vehicle load, the continuous track 14 may overheat, thereby reducing the longevity of the continuous track 14. As illustrated, certain embodiments of the undercarriage system 12 may include 6 roller wheels 32 arranged in two rows. Other embodiments of the undercarriage system 12 may include 2, 4, 6, 8, or more roller wheels arranged in one or more rows.

Figure 3:
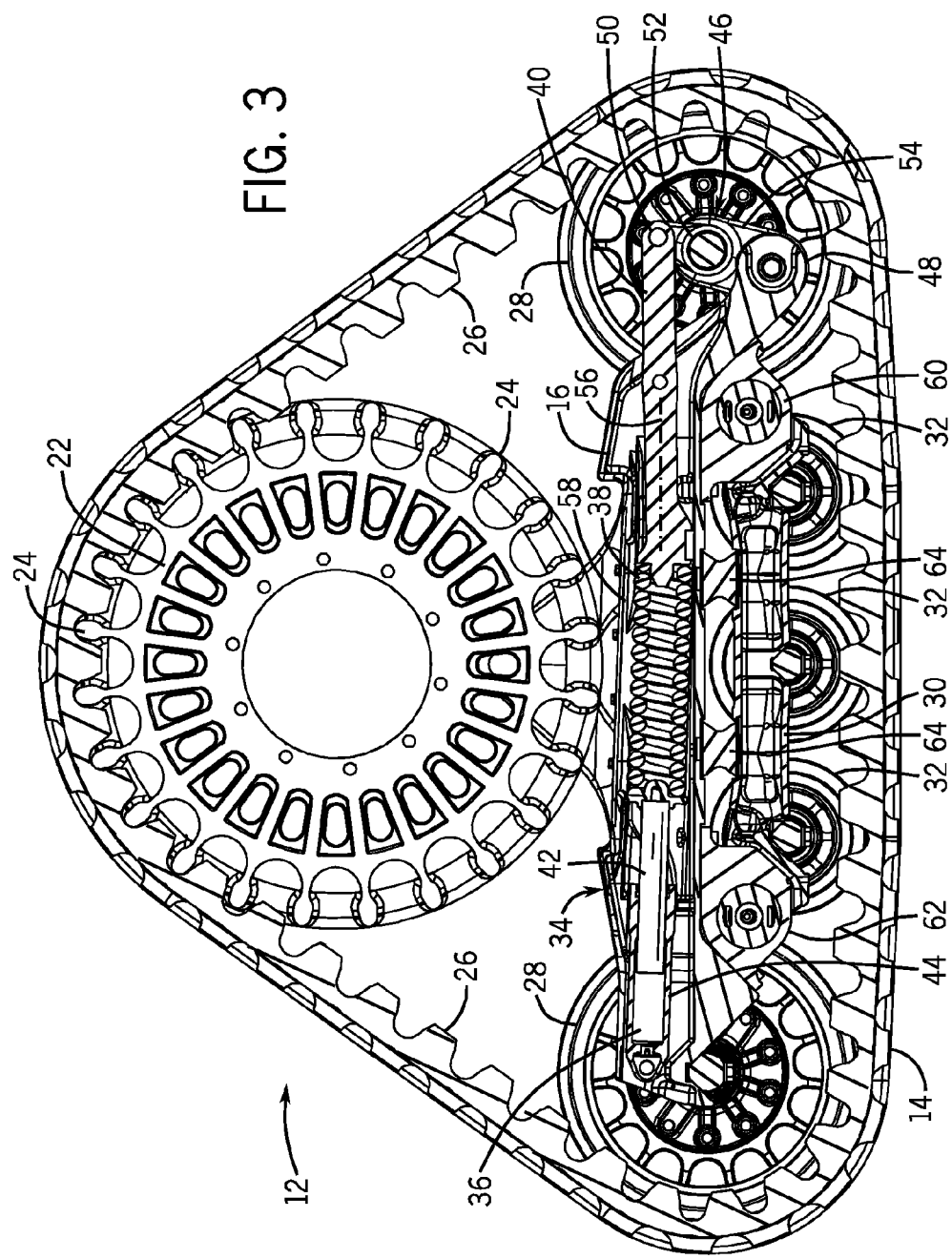
FIG. 3 is a cross-sectional view of the undercarriage system shown in FIG. 2.

FIG. 3 is a cross-sectional view of an embodiment of the undercarriage system 12 shown in FIG. 2. As illustrated, the undercarriage system 12 includes a tensioning system 34 disposed within the undercarriage beam 16. The tensioning system 34 includes an actuator 36, an overload protection system 38, and an extension arm 40. The actuator 36 includes a piston 42 and an actuator body 44. The extension arm 40 couples to a pivot assembly 46. The pivot assembly 46 includes a static pivot joint 48 and an extendable pivot joint 50 each coupled to an idler wheel axle 52 via a pivot plate 54. As discussed below, each pivot joint enables the idler wheel axle 52 to move in a substantially longitudinal direction in response to movement of the extension arm 40 along a longitudinal axis 56 of the tensioning system 34. Furthermore, the undercarriage system 12 includes a protection plate 58 coupled to the undercarriage beam 16 to protect the tensioning system 34 from dirt and other contaminants that may otherwise interfere with operation of the actuator 36, the overload protection system 38, or the extension arm 40.

In certain embodiments, the actuator may be a hydraulic cylinder. In such embodiments, the actuator body 44 may be filled with a hydraulic fluid, thereby urging the piston 42 out of the actuator body 44. The piston 42 pushes against the overload protection system 38. In the illustrated embodiment, the overload protection system 38 includes a coil spring configured to reduce pressure on the actuator 36. However, other embodiments may include other suitable overload protection systems, such as a hydraulic accumulator, which may employ raised weight, compressed gas, or metal bellows. Tension in the overload protection system 38 from the actuator 36 exerts pressure against the extension arm 40, thereby urging the arm 40 away from the actuator 36. As the extension arm 40, exerts a load along the longitudinal axis 56, the extendable pivot joint 52 is urged longitudinal outward, thereby urging the idler wheel axle 52 longitudinally outward. As will be appreciated, by urging the extension arm 40 outward at a desired pressure, the continuous track 14 may be loaded with a desired tension to block lateral movement/rotation of the continuous track 14 during operation of the vehicle 10.

Additionally, the undercarriage system 12 includes a front bushing mount 60 and a rear bushing mount 62 used to couple the roller wheel beam 30 to the undercarriage beam 16, as discussed below. Further, the undercarriage system 12 includes multiple vertical mounts 64. The vertical mounts 64 enable the undercarriage beam 16 to support a vertical load (e.g., weight of the vehicle 10), and to damp vertical movement of the roller wheel beam 30 during operation of the vehicle 10. Additionally, the illustrated embodiment of the undercarriage system 12 includes two vertical mounts, but other embodiments may include 0, 1, 2, 3, or more vertical mounts.

Figure 4:
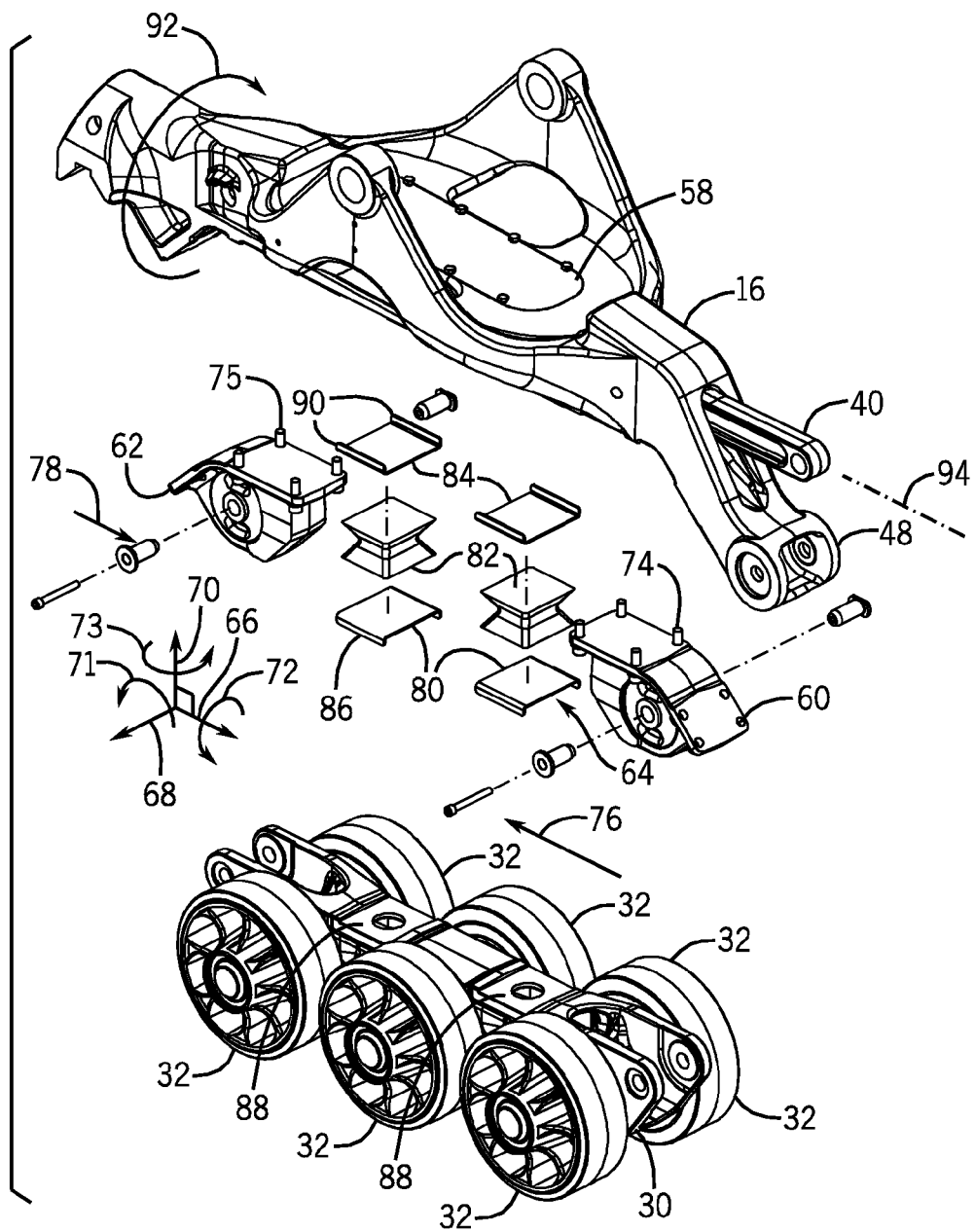
FIG. 4 is a partially exploded perspective view of the undercarriage system shown in FIG. 2.

FIG. 4 is a partially exploded perspective view of the undercarriage system 12 shown in FIG. 2. As illustrated, the undercarriage system 12 includes the undercarriage beam 16, the roller wheel beam 30, the front bushing mount 60, rear bushing mount 62, and the vertical mounts 64. For the purposes of the discussion, reference may be made to a longitudinal direction 66, a lateral direction 68, and a vertical direction 70 with respect to the undercarriage system 12. Reference may also be made to a pitch direction 71, a roll direction 72, and a yaw direction 73 for the undercarriage system 12.

In the illustrated embodiment, the front bushing mount 60 is coupled to the undercarriage beam 16 via front mount bolts 74, and the front bushing mount 60 is coupled to the roller wheel beam 30 via a front pin assembly 76. The rear bushing mount 62 is coupled to the undercarriage beam 16 via rear mount bolts 75, and the rear bushing mount 62 is coupled to the roller wheel beam 30 via a rear pin assembly 78. Other embodiments may couple the front bushing mount 60 and/or the rear bushing mount 62 to the undercarriage beam 16 using welding connection, brackets, braces, or other suitable connections.

Each vertical mount 64 includes a lower pad 80, a resilient pad 82, and an upper pad 84. In certain embodiments, the width of the lower pad 80 and the upper pad 84 in the lateral direction 68 is equal to a width of the undercarriage beam 16 in the lateral direction 68. In other embodiments, the width of the lower pad 80 and the upper pad 84 may be greater than or equal to the width of the roller wheel beam 30 in the lateral direction 68. Moreover, the lower pad 80 has two lower flanges 86 that extend downwardly in the vertical direction 70. The lower flanges 86 are positions on opposite lateral ends of each lower pad 80. The lower flanges 86 have a length in the longitudinal direction 66 that is less than or substantially equal to a length of a roller wheel beam notch 88 in the longitudinal direction 66. The roller wheel beam notch 88 is formed into the roller wheel beam 30 such that the notch 88 may receive the lower pad 80, and the lower pad 80 is planar with the lateral and upper faces of the roller wheel beam 30. In other words, the roller wheel beam notch 88 may be substantially the same size and shape as the lower pad 80.

As will be appreciated, the wheel beam notch 88 blocks the vertical mount 64 from moving in the longitudinal direction 66, and the lower flanges 86 block movement of the vertical mount 64 in the lateral direction 68. Similar to the lower pad 80, the upper pad 84 has two upper flanges 90 located on opposite lateral ends of the upper pad 84. The upper flanges 90 extend upwardly in the vertical direction 70 and have a length in the longitudinal direction 66 that is less than or substantially equal to the length of a notch in the undercarriage beam 16. The undercarriage beam notch secures the upper pad 84 to the undercarriage beam 16, and blocks movement of each respective vertical mount 64 in the longitudinal and/or lateral directions. The vertical mounts 64 also include a resilient pad 82. The resilient pad 82 provides support for the undercarriage beam 16 and enables the roller wheel beam 30 to move in the vertical direction 70. The resilient pad 82 also damps movement of the roller wheel beam 30 in the vertical direction 70, thereby reducing vibrations transmitted to the undercarriage beam 16, and ultimately the remainder of the vehicle 10 (e.g. driver compartment).

As will be appreciated, movement of the roller wheel beam 30 in the roll direction 72 may apply a torsional force 92 to the undercarriage beam 16. In addition, as the undercarriage beam 16 undergoes the torsional force 92, the torsional force 92 induces rotation in the undercarriage beam, thereby applying a shear force to the surface of the undercarriage beam 16 along its longitudinal axis 94. As described below, the undercarriage system 12 is designed to resist torsional and sheer loads.

Figure 5:
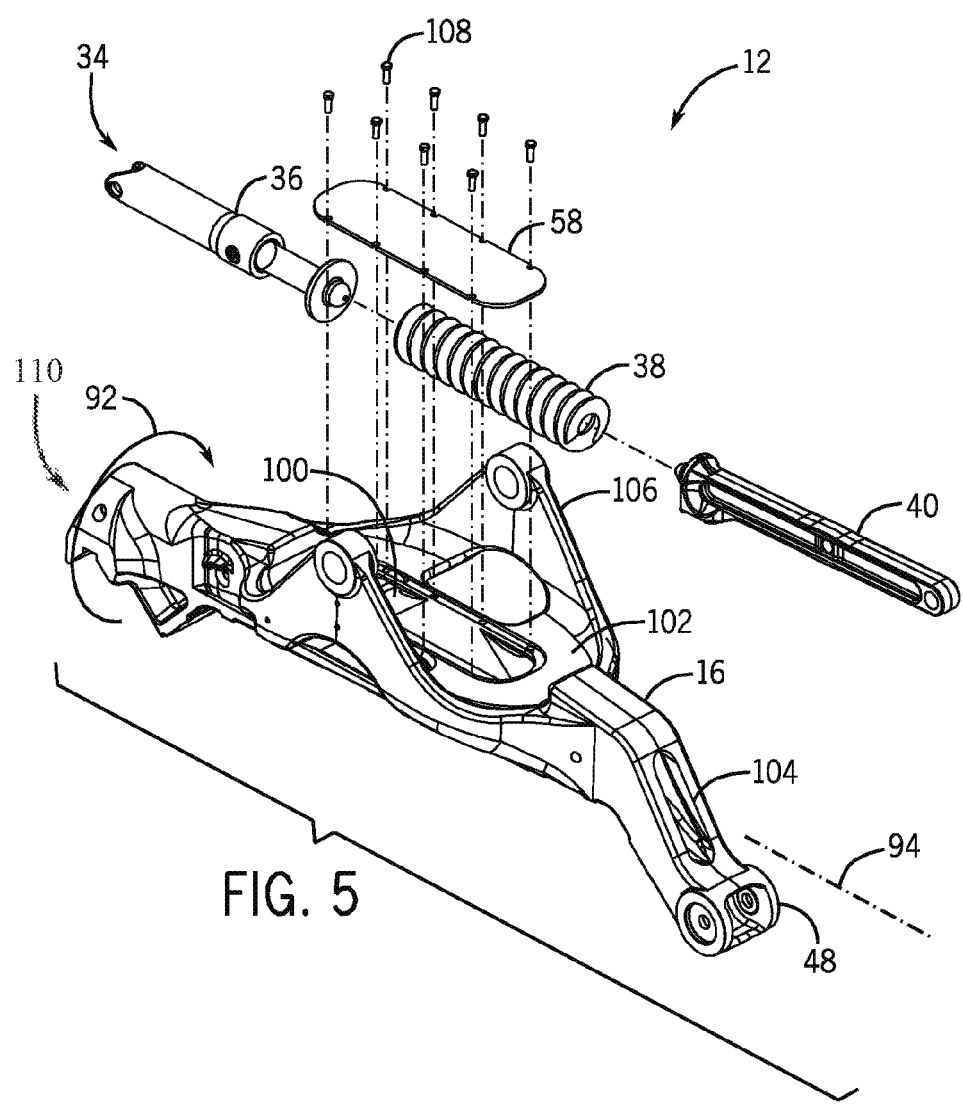
FIG. 5 is a partially exploded perspective view of an embodiment of an undercarriage beam and a tensioning system that may be employed within the SMS pension system of FIG. 2.

Accordingly, it is desirable to include an undercarriage beam 16 capable of withstanding torsional loads (e.g., torsional force 92) while enabling the insertion of the tensioning system 34 within the undercarriage beam 16. Some embodiments of the undercarriage beam enable the insertion of the tensioning system through an enlarged opening at one longitudinal end of the undercarriage beam. However, such embodiments have reduced torsional rigidity and, consequently, utilize additional material about the opening to reinforce the structure against torsional loads. In contrast, the present embodiment of the undercarriage beam 16 illustrated in FIG. 5 has torsional rigidity even without utilizing additional material. FIG. 5 is a partially exploded perspective view of the undercarriage beam 16 and the tensioning system 34. The illustrated embodiment of the undercarriage beam 16 enables insertion of the tensioning system 34 through a first opening 100 in an upper face 102 of the undercarriage beam 16. The undercarriage beam 16 further includes a smaller second opening 104 located at a longitudinal end of the undercarriage beam 16.

When the tensioning system 34 is inserted into the undercarriage beam 16 into a cavity within the undercarriage beam 16. Through the first opening 100, a portion of the extension arm 40 extends through the second opening 104 to facilitate coupling with the pivot assembly 46. As will be appreciated, by enabling the insertion of the tensioning system 34 through the first opening 100, the illustrated undercarriage beam 16 is substantially more resistant to torsional loads than an embodiment including a second opening large enough to enable insertion of the tensioning system 34 into the undercarriage beam 16. Additionally, the coupling of the bushing mounts, 60, 62 with the undercarriage beam 16 adds additional support to the undercarriage beam 16, thereby further increasing the capability of the undercarriage beam 16 to withstand torsional loads. By locating the first opening 100 between two arms 106, the torsional load may be substantially distributed to the arms 106, which couple to the axle structure of the vehicle. Through the arms 106 and the axle structure connection, the undercarriage beam 16 transfers the torsional load through the axle structure rather than across the upper face 102 of the undercarriage beam 16. Consequently the first opening 100 does not substantially reduce the torsional rigidity of undercarriage beam 16. Accordingly, by placing the opening at the upper surface 102 of the undercarriage beam 16 rather than at the longitudinal end, the cost and weight of the undercarriage system 12 is reduced without weakening the undercarriage beam 16 to torsional loads.

Additionally, in certain embodiments, the protection plate 58 is coupled to the undercarriage beam 16 by bolts 108 to block contaminants from entering the undercarriage beam and interfering with operation of the tensioning system 34. In other embodiments, the protection plate 58 may be coupled to the undercarriage beam 16 using brackets, braces, welded connections, or other suitable methods of sealing the first opening 100 to block contaminants.

A third opening 110 is included at an opposite longitudinal of the undercarriage beam 16 from the second opening 104. The third opening 110 enables the insertion of a core support into the undercarriage beam 16 during a casting process used to form the undercarriage beam 16. For example, in sand casting, a sand core may be used to establish a cavity in the undercarriage beam 16. As will be appreciated, sand cores are less dense than molten metal. The lower density encourages flotation of the sand core during the casting process. To block flotation, the sand core may be held in place using a core support that blocks movement of the core during casting. Typical core supports may include chaplets, internal/exterior reinforcements, frames, and/or other suitable core support elements. Specifically, in the undercarriage beam 16, the core support may extend through the first opening 100, the second opening 104, and/or the third opening 110 to block the core from floating when molten material is poured into the mold.

Figure 6:
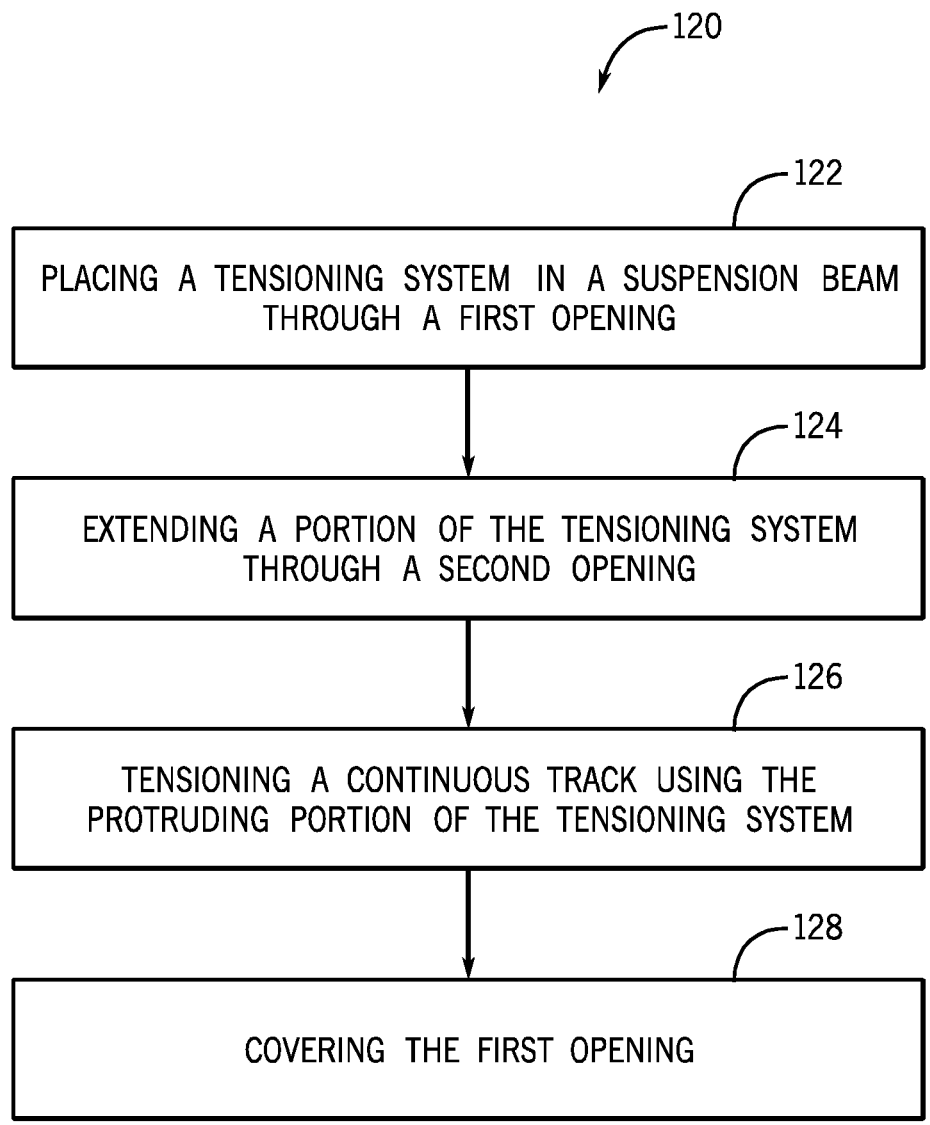
FIG. 6 is a flowchart of an embodiment of a method for manufacturing an undercarriage system for a tracked work vehicle.

FIG. 6 is a flowchart of an embodiment of a method 120 for manufacturing an undercarriage system for a tracked work vehicle. The method 120 includes inserting the tensioning system 34 into the cavity of the undercarriage beam through the first opening 100 in the upper surface of the undercarriage beam 16 (block 122). The tensioning system 34 may be inserted into the undercarriage beam 16 as individual pieces in any order. For example, certain embodiments may include inserting the pieces individually, with the extension arm 40 and the actuator 36 each being installed before the overload protection system 38. In other embodiments, the tensioning system 34 may be inserted into the undercarriage beam 16 as one or more units with each unit being composed of more than one component (e.g., the actuator 36 and overload protection system 38 as a unit). In embodiments including a spring as the overload protection system 38, the spring may be pre-loaded (e.g., compressed) to enable the spring to be inserted into the undercarriage beam 16. Alternatively or additionally, the actuator 36 may be pressurized before (e.g., by filling a hydraulic cylinder at least partially with a hydraulic fluid) or after being inserted into the undercarriage beam 16. In some embodiments, the extension arm 40 may protrude at least partially through the second opening 104 as a result of inserting the tensioning system 34 into the undercarriage beam 16. Other embodiments may include an extension arm 40 that does not protrude through the second opening 104 until extended or coupled to an additional extension arm.

In each of the various embodiments, after the tensioning system 34 is inserted into in the undercarriage beam 16, a portion of the tensioning system is extended through the second opening 104 (block 124). Extending a portion may include coupling an extension arm to the tensioning system, decompressing a spring, pressurizing the actuator, or any other suitable method for extending the extension arm 40 through the second opening 104. The portion of the tensioning system 34 protruding through the second opening 104 is then coupled to the pivot assembly 46. As previously discussed, the tensioning system 34 may then apply tension to the continuous track 14 through the pivot assembly 46 (block 126). After inserting the tensioning system 34 into the first opening 100, the first opening 100 may be sealed by attaching the protection plate 58 using bolts 108, brackets, welded connections, braces, clamps, and/or another connection suitable for protecting the interior of the undercarriage beam 16 from contaminants that may interfere with operation of the tensioning system 34 (block 128).

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An undercarriage system for a tracked work vehicle, comprising:
   a tensioning system configured to provide tension to a continuous track;
   an undercarriage beam extending between a first longitudinal end and a second longitudinal end, the undercarriage beam comprising:
   a first opening located on an upper face of the undercarriage beam between the first and second longitudinal ends, wherein the first opening is configured to enable insertion of the tensioning system into a cavity of the undercarriage beam; and
   a second opening located at the first longitudinal end of the undercarriage beam, wherein the cavity is defined within the undercarriage beam between the first and second openings, and wherein the second opening is configured to enable a portion of the tensioning system to extend through the second opening to enable the tensioning system to pivotably couple to an idler wheel via a pivot assembly, and wherein the idler wheel is configured to engage the continuous track,
   wherein at least a portion of the tensioning system extends through the cavity from the first opening to the second opening.

2. The undercarriage system of claim 1, wherein the tensioning system comprises an extension arm, an actuator, and an overload protection system.

3. The undercarriage system of claim 2, wherein the overload protection system comprises a coil spring or a hydraulic accumulator.

4. The undercarriage system of claim 2, wherein the actuator comprises a hydraulic cylinder.

5. The undercarriage system of claim 1, comprising a cover plate configured to cover the first opening after insertion of the tensioning system.

6. The undercarriage system of claim 1, comprising a plurality of roller wheels arranged in pairs, wherein the roller wheels of each pair are laterally separated from one another by a distance greater than or equal to a width of the undercarriage beam.

7. The undercarriage system of claim 1, wherein the undercarriage beam is formed from ductile iron.

8. An undercarriage system for a tracked work vehicle, comprising:
   a tensioning system configured to provide tension to a continuous track;
   an undercarriage beam comprising:
      a first opening located on an upper face of the undercarriage beam, wherein the first opening is configured to enable insertion of the tensioning system into a cavity of the undercarriage beam,
      a second opening located at one longitudinal end of the undercarriage beam, wherein the second opening is configured to enable a portion of the tensioning system to extend through the second opening to enable the tensioning system to pivotably couple to an idler wheel via a pivot assembly, and wherein the idler wheel is configured to engage the continuous track; and
      a third opening located at an opposite longitudinal end of the undercarriage beam from the second opening, wherein the third opening is configured to provide core support during a casting process.

9. A method for manufacturing an undercarriage system for a tracked work vehicle, comprising:
   inserting a tensioning system in to a cavity of an undercarriage beam through a first opening in an upper face of the undercarriage beam, wherein the cavity is within the undercarriage beam and extends between the first opening and a second opening in a longitudinal end of the undercarriage beam;
   extending a portion of the tensioning system through the second opening; and
   tensioning a continuous track using the extended portion of the tensioning system.

10. The method of claim 9, wherein the tensioning system comprises an actuator, an overload protection system, and an extension arm, wherein a portion of the extension arm is configured to extend through the second opening.

11. The method of claim 10, wherein tensioning the continuous track comprises pivotally coupling the extended portion of the extension arm to an idler wheel via a pivot assembly, and biasing the idler wheel extended towards the continuous track.

12. The method of claim 9, comprising covering the first opening by securing a plate to the undercarriage beam after inserting the tensioning system into the cavity of the undercarriage beam.

13. An undercarriage system for a tracked work vehicle, comprising:
   a continuous track;
   a pair of idler wheels each configured to engage the continuous track;
   a tensioning system configured to tension the continuous track by biasing each idler wheel longitudinally outward, wherein the tensioning system comprises an extension arm, an actuator, and overload protection system;
   an undercarriage beam disposed about the tensioning system, wherein the undercarriage beam comprises:
      a first opening located on an upper face of the undercarriage beam, wherein the first opening is configured to enable insertion of the tensioning system into a cavity defined within the undercarriage beam; and
      a second opening located at a longitudinal end of the undercarriage beam, wherein the second opening is configured to enable the extension arm to protrude through the opening to rotatably couple with a respective idler wheel via a pivot assembly,
      wherein the cavity extends between the first and second openings within the undercarriage beam, and
   wherein the tensioning system extends through the cavity from the first opening to the second opening.

14. The undercarriage system of claim 13, comprising a plurality of roller wheels arranged in pairs, wherein the roller wheels of each pair are laterally separated from one another by a distance greater than or equal to a width of the undercarriage beam.

15. The undercarriage system of claim 13, wherein the overload protection system comprises a coil spring or a hydraulic accumulator.

16. The undercarriage system of claim 13, wherein the actuator is a hydraulic cylinder.

17. The undercarriage system of claim 13, wherein the undercarriage beam is formed from ductile iron.

18. The undercarriage system of claim 13, wherein the undercarriage beam comprises a pair of vertical arms configured to couple the undercarriage system to an axle structure and to transfer torsional loads to the axle structure.

19. The undercarriage system of claim 18, wherein the, vertical arms is configured to provide support to the upper face of the undercarriage beam.

20. The undercarriage system of claim 13, wherein the second opening is smaller than the first opening.

21. The undercarriage system of claim 13, further comprising a third opening located at an opposite longitudinal end of the undercarriage beam from the second opening, wherein the third opening is configured to provide core support during a casting process.

* * * * *